T. GUERIN.
ADJUSTABLE WATER GATE AND GAGE.
No. 176,951. Patented May 2, 1876.
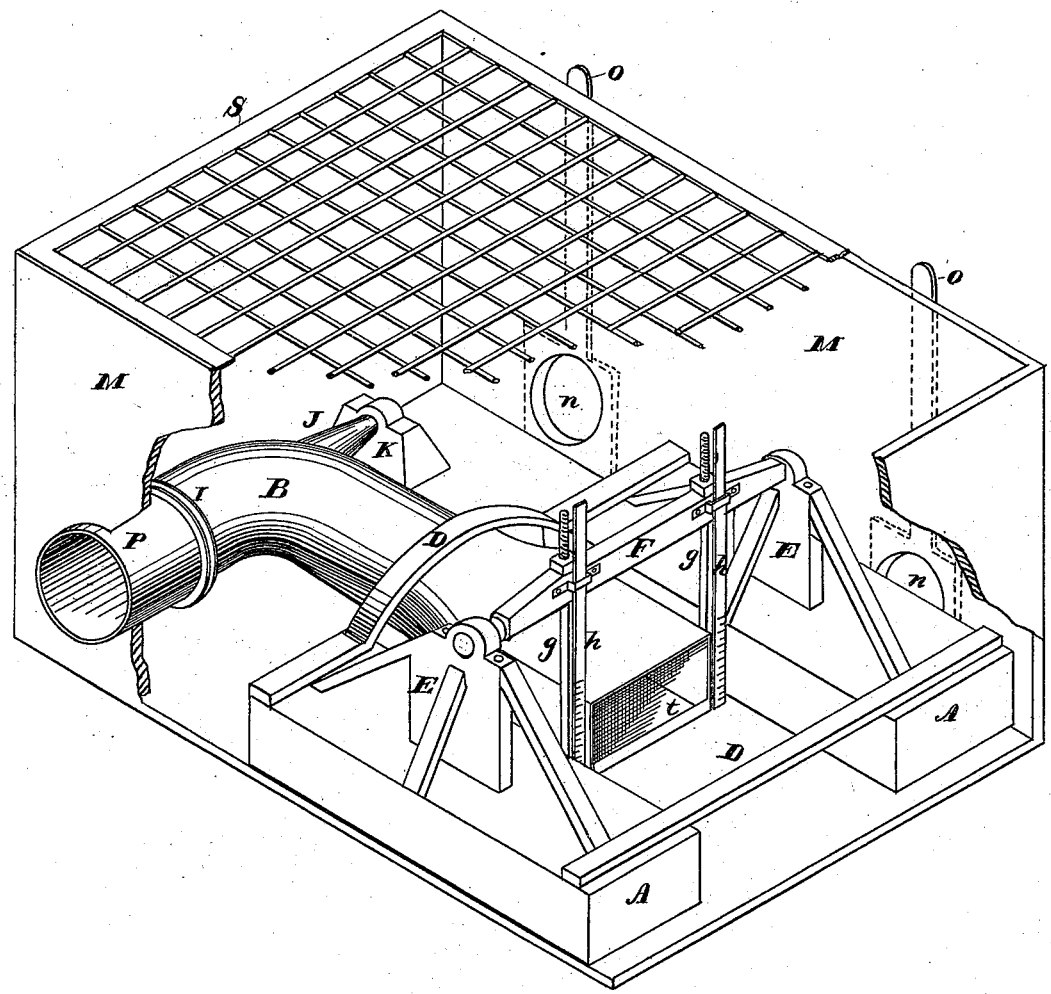
Witnesses
Geo. H. Strong.
Jno. L. Boone
Inventor
Thomas Guerin
by Dewey & Co
Attys.

UNITED STATES PATENT OFFICE.

THOMAS GUERIN, OF SAN FRANCISCO, CALIFORNIA.

IMPROVEMENT IN ADJUSTABLE WATER GATES AND GAGES.

Specification forming part of Letters Patent No. 176,951, dated May 2, 1876; application filed March 13, 1876.

*To all whom it may concern:*

Be it known that I, THOMAS GUERIN, of San Francisco city and county, State of California, have invented a Gage for Regulating and Measuring the Flow of Water; and I do hereby declare the following description and accompanying drawings are sufficient to enable any person skilled in the art or science to which it most nearly appertains to make and use my said invention, without further invention or experiment.

My invention relates to a machine for regulating and gaging the amount of water which flows from a river, lake, canal, or other reservoir.

My improved machine is especially applicable where water is to be drawn from a lake, river, canal, or other reservoir, and distributed to various points and tenants for irrigation and other purposes, and its object is to provide a means for delivering a steady and uniform quantity of water at all times through an outlet, notwithstanding the rise and fall of the water in the reservoir.

In order to more fully illustrate and explain my invention, reference is had to the accompanying drawings, in which—

Figure 1 is a perspective view of my invention.

In the stream, lake, canal, or other reservoir from which the liquid is to be drawn I place two parallel floating bodies, A A, which may be composed of wood or other light floatable substance or material.

These floating bodies I place far enough apart to admit between them the end of a pipe, B, or other box or tube, into which the water or liquid is to be drawn, and then I connect the two floats together by means of a transverse connecting-bar, D, at each end, so that they will act in unison and form a single float.

Upon each float, A, near its middle, I construct an upright standard, E. These standards serve to support a transverse beam, F, the ends of which are formed into journals, and are supported in boxes on the upper ends of the standards, so that the beam extends across the space between the two floats. The pipe, tube, or box B, into which the water or other liquid is to be drawn, has its open end suspended from the transverse beam F by means of screw-rods $g$ $g$, so that it will rest upon the water between the two floats.

The beam F always maintains its relative position to the surface of the water; but by turning the screw $g$ $g$ up or down the mouth of the pipe B can be depressed below or raised above the water surface, as desired.

One or more gage-rods, $h$, are used to connect the pipe with the beam, so that the exact amount of depression or elevation can be ascertained at any time by examining the gage-marks, which indicates the quantity flowing through it. The pipe or box B is bent at right angles at a short distance from the float, and a joint at I permits its extremity, which is attached to the screw-rods, to rise and lower. An extension, J, projects from the angle or elbow of the pipe at right angles to the joint I, and bears in a box in the upper end of a fixed standard, K, so as to provide a support outside of the joint and insure its free action when the extremity of the pipe is raised or lowered. The floats A A I place inside of a box or housing, M, into which the water is admitted through one or more openings, $n$ $n$, which can be closed by gates $o$ $o$. The end of the pipe P, into which the water is to be conducted, and with which the pipe or box B is connected at the joint I, passes through a hole in the box, so that the joint I is inside of the box.

When water is admitted into the box the floats will swim upon its surface. The open end of the pipe B can then be lowered by means of the screw-rods until the desired quantity of water enters its mouth.

A cover, S, which may be of wire-cloth or other transparent medium, is then secured over the box to prevent the machine from being tampered with.

The ingress opening or mouth of the pipe B I make rectangular, and place a weir, $t$, across its lower side, over which the water will flow when the pipe is sufficiently depressed.

I thus provide a device for gaging and regulating the flow of water into pipes, which will be especially useful where a number of tenants are each to be supplied with a stated quantity for irrigation and similar purposes.

My arrangement insures the customer his proper quantity, as the supply cannot be tampered with without opening the inclosing case or housing.

Having thus described my invention, what I claim, and desire to secure by Letters Patent, is—

1. The connected floats A A, having the standards E and transverse beam D, in combination with the pipe or box B, connected with the beam F by means of the screw-rods $g\, g$, and provided with a self-acting weir, substantially as and for the purpose described.

2. In combination with the float A, having the transverse beam D, and arranged to support a pipe or box, B, for the purpose specified, I claim the gage-rod $h\, h$, substantially as and for the purpose described.

3. The case or housing M, with its transparent top, and having the inlet openings $n\, n$, and outlet opening, through which the pipe P passes, in combination with the float A A and hinged pipe or box B, substantially as and for the purpose described.

THOMAS GUERIN.

Witnesses:
GEO. H. STRONG,
JNO. L. BOONE.